United States Patent
Higginbotham

(10) Patent No.: US 12,055,255 B2
(45) Date of Patent: Aug. 6, 2024

(54) SYSTEM AND METHOD FOR VISUALLY INDICATING WHETHER PIPE JOINTS HAVE BEEN PROPERLY CRIMPED

(71) Applicant: MERIT BRASS CO., Cleveland, OH (US)

(72) Inventor: Tyson Higginbotham, Lake Wylie, SC (US)

(73) Assignee: MERIT BRASS CO., Cleveland, OH (US)

( * ) Notice: Subject to any disclaimer, the term of this patent is extended or adjusted under 35 U.S.C. 154(b) by 0 days.

(21) Appl. No.: 17/318,080

(22) Filed: May 12, 2021

(65) Prior Publication Data

US 2021/0381634 A1 Dec. 9, 2021

Related U.S. Application Data

(60) Provisional application No. 63/035,038, filed on Jun. 5, 2020.

(51) Int. Cl.
| | |
|---|---|
| *F16L 55/00* | (2006.01) |
| *F16L 13/14* | (2006.01) |
| *F16L 47/22* | (2006.01) |

(52) U.S. Cl.
CPC ............. *F16L 55/00* (2013.01); *F16L 13/142* (2013.01); *F16L 47/22* (2013.01)

(58) Field of Classification Search
CPC ...... F16L 13/142; F16L 55/00; F16L 2201/10; F16L 13/141; F16L 47/22
See application file for complete search history.

(56) References Cited

U.S. PATENT DOCUMENTS

| | | | |
|---|---|---|---|
| 9,523,451 B1 | 12/2016 | Nichols | |
| 2010/0253066 A1* | 10/2010 | Cygler, III | B21D 39/048 285/39 |
| 2013/0167357 A1* | 7/2013 | Arment | B21D 39/046 148/684 |
| 2015/0354737 A1* | 12/2015 | Stout | F16L 21/022 285/369 |

FOREIGN PATENT DOCUMENTS

| | | | | |
|---|---|---|---|---|
| DE | 2424353 A1 | * | 12/1975 | |
| DE | 2725280 A1 | * | 12/1978 | |
| EP | 1413814 A1 | * | 4/2004 | ............ F16L 13/141 |

OTHER PUBLICATIONS

English Translation (machine) of the descriptive portion of EP-1413814, retrived from https://worldwide.espacenet.com/ on Sep. 7, 2022.*

* cited by examiner

*Primary Examiner* — Zachary T Dragicevich
*Assistant Examiner* — James A Linford
(74) *Attorney, Agent, or Firm* — McDonald Hopkins LLC

(57) ABSTRACT

The present invention relates to a female press fitting that is provided with a visual indicator that indicates whether the female press fitting has been properly crimped onto a male pipe or fitting.

16 Claims, 4 Drawing Sheets

SYSTEM AND METHOD FOR VISUALLY INDICATING WHETHER PIPE JOINTS HAVE BEEN PROPERLY CRIMPED

CROSS-REFERENCE TO RELATED APPLICATION

This application claims priority under 35 U.S.C. § 119(e) from the following U.S. provisional application: Application Ser. No. 63/035,038 filed on Jun. 5, 2020. That application is incorporated in its entirety by reference herein.

FIELD OF THE INVENTION

The present invention relates to pipe couplings and more particularly to a system and process for visually indicating whether pipe couplings comprising male and female fittings have been properly crimped.

BACKGROUND OF THE INVENTION

Copper press fittings have long been used to quickly and easily form leak tight joints between male and female pipe connections. Typically, these copper press fittings are integrated into a pipe network that includes an array of pipe and fittings secured together. Typically, the female press fitting includes a raised bead that is disposed adjacent to one end of the female fitting. Contained in the female press fitting is a sealing element that typically lies in an internal groove formed by the raised bead. A joint is created by extending a male pipe or fitting into the female press fitting a selected distance. To form a leak tight seal between the two, a crimping tool engages the bead and crimps the same, causing the internal sealing element to seal the interface between the male pipe or fitting and the female press fitting. More particularly, when the crimping tool crimps the bead of the female press fitting, this imparts a mechanical force against the bead which results in the female press fitting being deformed and causing the internal sealing element to impinge on the outer diameter of the male pipe or fitting, thereby creating a permanent leak tight seal.

There are a number of advantages to this approach of connecting female press fittings to male pipe or fittings. One advantage of a pressed fitting over conventional joining methods is speed of installation which can be accomplished without flux, filler material, sealing compounds or open flames. Besides that, such a system and process is safe and presents a neat and clean appearance to the joint.

In pipe networks, there can be hundreds of joints created by male and female press fittings. In some cases, numerous workers are involved in installing the pipe network. Sometimes pipe joints are not crimped or are improperly crimped, resulting in a problem. Eventually the pipe network will be pressurized and where joints have not been crimped or have been improperly crimped, leaks will occur and in some cases the pipe fittings will break apart, creating environmental, economic and safety hazards in and around the pipe network.

Therefore, there is a need for a system and process that will enable plumbers and other workers to easily determine if pressed fitting joints in a pipe network have been properly crimped.

SUMMARY OF THE INVENTION

The present invention entails a method of preparing a female press fitting with a visual indicator that indicates whether the female press fitting has been crimped around a male pipe or fitting to form a leak tight seal. A heat shrinkable plastic ring is applied to a raised bead formed on the outer surface of the female press fitting. Heat is applied to the plastic ring on the raised bead forming a firmly affixed plastic ring that extends around and surrounds the bead. The plastic ring is designed such that once it has been heat shrunk around the bead, the heat shrunk plastic ring will break away in at least one piece from the female press fitting in response to a crimping force being applied during installation. Thus, the presence of the heat shrunk plastic ring on the bead of the female press fitting indicates that the bead has not been crimped or has not been properly crimped.

In another embodiment, the present invention entails a female press fitting designed to receive a male pipe or fitting. The female press fitting includes a pipe section having at least two ends and at least one raised bead formed on the pipe section adjacent to one end. The raised bead forms an internal groove in the pipe section. A sealing element is disposed in the groove underneath the raised bead. A heat shrunk plastic ring extends over and around the bead and is held onto the pipe section. The heat shrunk plastic ring is designed to break into at least one piece and separate from the female press fitting in response to a crimping force being applied to the heat shrunk plastic ring and the underlying bead. The presence of the heat shrunk plastic ring on the female press fitting that has received the male pipe or fitting indicates that the female press fitting has not been crimped or has not been properly crimped.

Other objects and advantages of the present invention will become apparent and obvious from a study of the following description and the accompanying drawings which are merely illustrative of such invention.

BRIEF DESCRIPTION OF THE DRAWINGS

FIG. 1C is a view similar to FIG. 1B but showing the heat shrunk plastic band broken or ruptured into one piece following crimping.

DESCRIPTION OF EXEMPLARY EMBODIMENT

With further referenced to the drawings, the present invention describes a female press fitting that includes a visual indicator that is designed to indicate whether the female press fitting has been crimped or has been properly crimped. As discussed below, the female press fitting includes a heat shrunk color coded plastic ring that extends around the raised bead of the female press fitting. This heat shrunk plastic ring is designed to rupture and fall from the female pipe fitting in response to a crimping action being applied to the heat shrunk plastic ring and bead. Hence, when a pipe network comprising an array of pipe and male and female press fittings is inspected, an inspector can readily determine if the various pipe joints formed in the pipe network have been properly crimped.

Figure 1A:
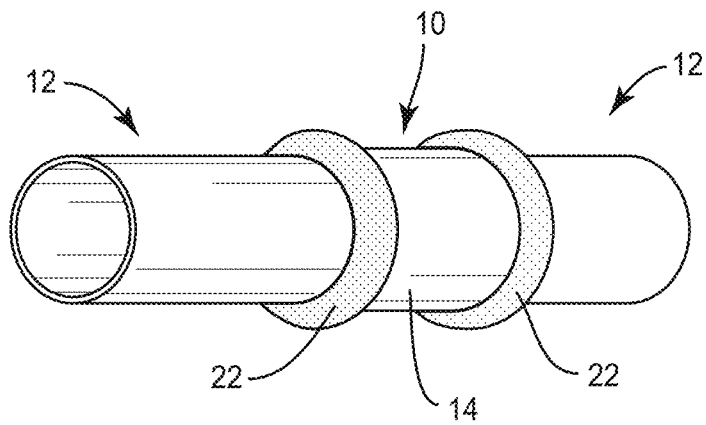
FIG. 1A is a perspective view showing male pipe inserted into opposite ends of a female press fitting.
Figure 1B:
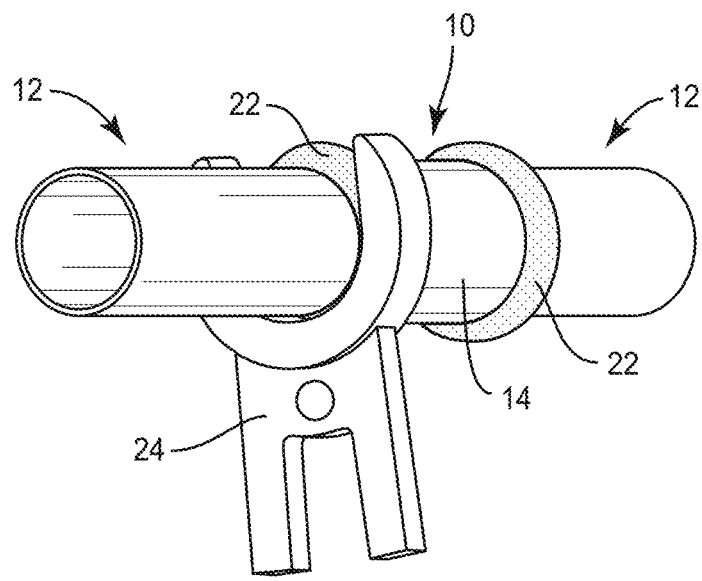
FIG. 1B is a perspective view of the assembly shown in FIG. 1A but showing a crimping tool engaging one of the heat shrunk visual indicators formed on the female press fitting.
Figure 1D:
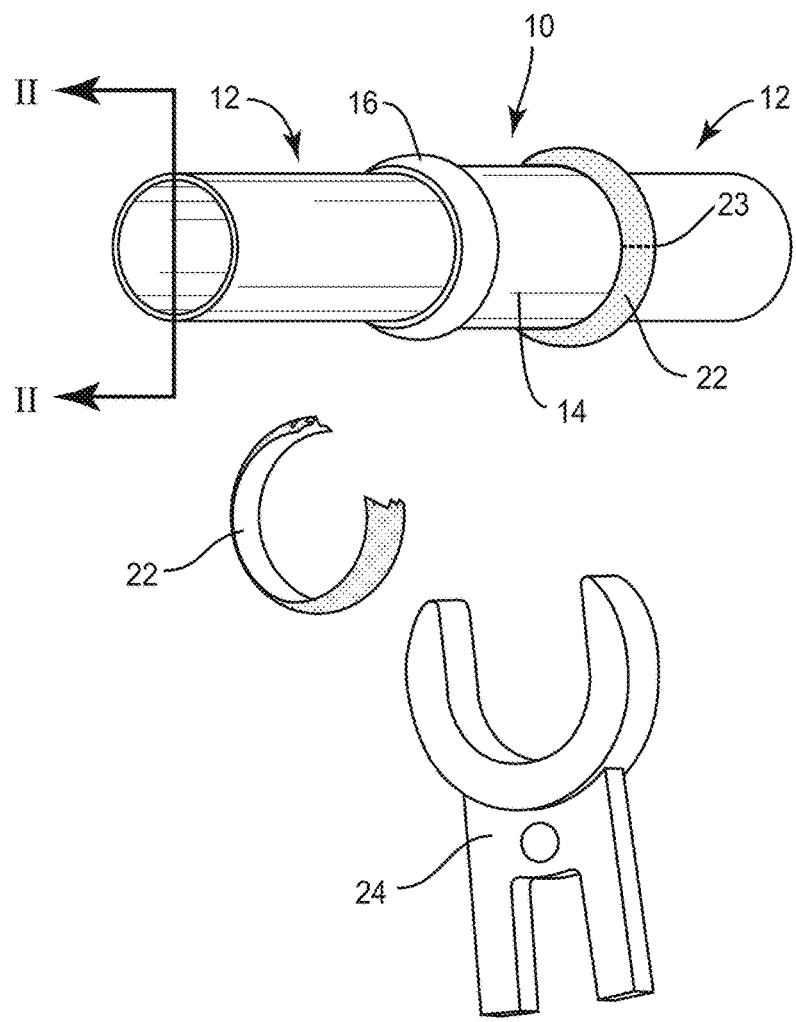
FIG. 1D is a perspective view of the female press fitting coupled to opposed male pipe after crimping.
Figure 1D:
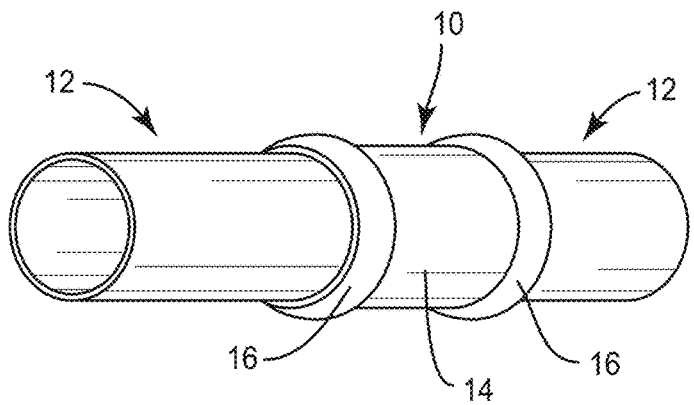
Figure 2:
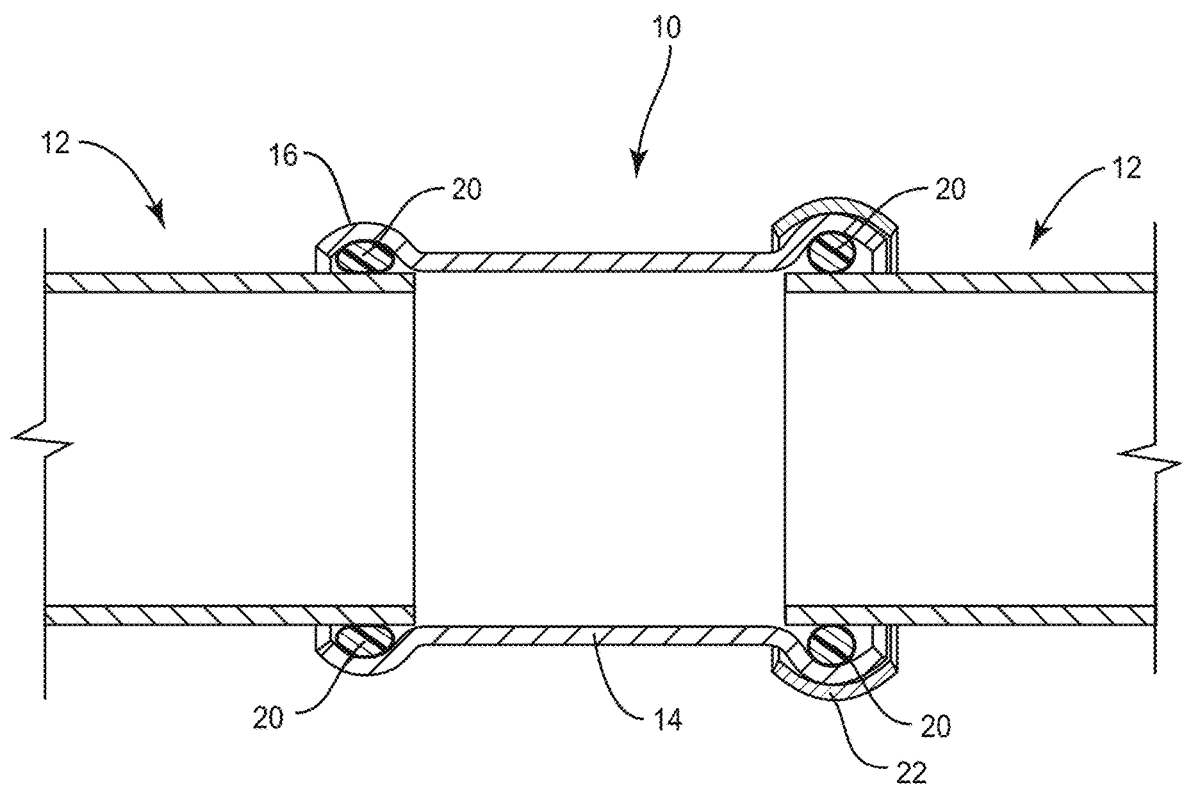
FIG. 2 is a cross-sectional view taken along the lines II-II of FIG. 1C.
Figure 3A:
FIG. 3A is a schematic view of a strip.
Figure 3B:
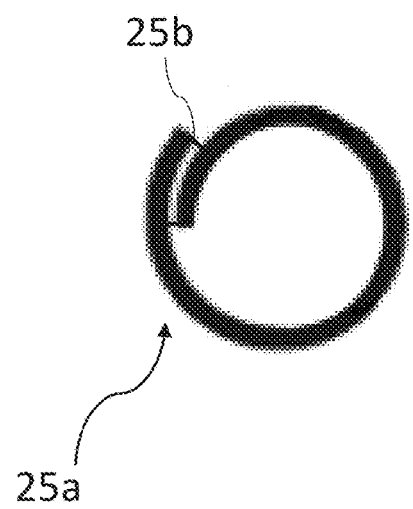
FIG. 3B is a schematic view of the strip of FIG. 3A folded over on itself and held together with an adhesive.

Now with particular reference to the drawings, particularly FIG. 1, there is shown therein a female press fitting indicated generally by the numeral 10. The female press fitting 10 is designed to receive a male pipe or fitting 12. In the particular embodiment or design shown in FIG. 1A, the female press fitting 10 includes opposed ends and there is a male pipe or fitting 12 inserted into each end thereof. As discussed below, in forming a joint between a female press fitting 10 and a male pipe or fitting 12, the male pipe or fitting is inserted into the female press fitting and thereafter the interface is sealed through a crimping procedure that causes an internal seal 20 to impinge and engage a portion of the underlying male pipe or fitting 12. See FIG. 2.

Female press fitting 10 comprises in one design or embodiment a pipe section 14. Pipe section 14 includes opposed ends. Pipe section 14 is provided with one or two raised beads 16. In the embodiment illustrated herein, pipe section 14 is provided with a pair of axially spaced beads 16 with each bead being disposed adjacent to one end portion of the pipe section. See FIG. 1D.

The raised bead 16 forms an internal groove 18 that extends around the underside of the bead 16. Seated in the groove 18 is a sealing element 20, such as an O-ring. Formed on the raised bead 16 is a heat shrunk plastic ring 22. In the manufacturing process, a plastic ring is inserted over and around the bead 16. The plastic ring can be provided with a perforation line 23 that will enable the ring to rupture and separate from the female press fitting 10. There are various processes that can be used to assure that the ring, once heat shrunk around the bead 16, will rupture or break in response to a crimping action. As noted above, one approach is to provide a perforated line extending transversely across the plastic ring in one area. Another possible approach is to utilize a plastic ring having a varying thickness with one relatively thin area of the ring being particularly designed to rupture or break in response to a crimping action being applied to the ring. Alternately, the plastic ring may be designed with a uniform thickness and a yield strength sufficiently low such that the plastic ring tears away from the bead during the crimping action. In another example, the plastic material is produced in strips 25a which are folded over on themselves and held together with an adhesive 25b. The resulting ring will typically fail (break away) where it is joined together. A typical crimping tool exerts a force of approximately 7200 pounds onto the bead. The plastic ring disclosed herein is designed to rupture or break at about 20% of the crimping force. This insures that the heat shrunk plastic ring will always break and fall away.

The basic idea underlying the present invention is to provide a visual indicator that will indicate to an inspector or other worker that the female press fitting 10 has been properly crimped onto the male pipe or fitting 12. That is, during the inspection process, if a female press fitting 10 includes the heat shrunk plastic ring 22 extending around the bead 16, then it is apparent that the female press fitting 10 has not been crimped or properly crimped. On the other hand, if after installation the inspection reveals that there are no heat shrunk plastic rings 22 on any of the female press fittings 10, then it follows that they have all been appropriately crimped which in turn creates a leak tight seal at the interface between the male pipe or fittings 12 and the female press fittings 10.

As noted above, the heat shrunk plastic ring 22 is incorporated into the female press fitting 10 during the manufacturing process. When the female press fittings reach a job site, they are typically used in a pipe network that includes a series of male pipe or fittings and a series of female press fittings.

In the course of forming a pipe network, the male pipe or fittings 12 are inserted into one end of the female press fittings 10. See FIG. 2. The male pipe or fitting 12 is inserted to where at least the seal 20 in the female press fitting 10 overlies a portion of the male pipe or fitting. At this point, a crimping tool 24 is used. The crimping tool 24 is placed around the heat shrunk plastic ring 22 and a crimping force is applied to the plastic ring as well as the underlying bead 16. This crimping action causes the internal sealing element 20 to be driven inwardly into sealing contact with the underlying male pipe or fitting 12. This creates a leak tight seal. See FIG. 2 where only the leftmost bead has been crimped, causing the seal 20 to form a leak tight joint between the female press fitting 10 and the male pipe or fitting 12. The crimping action of the crimping tool 24 causes the heat shrunk plastic ring 22 to rupture or break. It is designed to rupture or break in response to a crimping force being applied. When the heat shrunk plastic ring ruptures or breaks, in a preferred embodiment, it breaks in one place or along a perforated line and falls away from the female press fitting 10. See FIG. 1C. Once the heat shrunk plastic ring 22 has ruptured and falls from the female press fitting 10, this is an indication that the joint created between the female press fitting 10 and the male pipe or fitting 12 is leak tight.

The basic concepts underlying the present invention come from the necessity of having means to quickly and easily determine if a small diameter (½"-2") copper press fitting has been pressed prior to pressurizing a network of pipes and contain the correct sealing element for a given application. The heat shrunk plastic rings 22 can be color coded, which allows for a quick visual determination of the sealing element inside of the fitting, even from a significant distance. This is an advantage as the sealing elements used are nearly identical in appearance and are otherwise difficult to differentiate.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A female press fitting designed to receive a male pipe or fitting and comprising:
    a pipe section;
    the pipe section having at least two ends;
    at least one raised bead formed in the pipe section adjacent to one end;
    the raised bead forming an internal groove in the pipe section;
    a sealing element disposed in the internal groove underneath the raised bead;
    a heat shrunk plastic ring extending over and around the raised bead and held on the pipe section;

the heat shrunk plastic ring designed to break in one place and separate from the pipe section in response to a crimping force being applied to the heat shrunk plastic ring and the raised bead; and wherein presence of the heat shrunk plastic ring on the female press fitting that has received the male pipe or fitting indicates that the female press fitting has not been crimped or has been improperly crimped, and wherein the heat shrunk plastic ring comprises strips held together with an adhesive.

2. The female press fitting of claim 1 wherein the heat shrunk plastic ring is color coded based on the sealing element used.

3. The female press fitting of claim 2 wherein the heat shrunk plastic ring is color coded with any color.

4. The female press fitting of claim 1 wherein a pair of raised beads are axially spaced on the pipe section forming the two ends.

5. The female press fitting of claim 1 wherein the sealing element is configured to engage the male pipe or fitting to form a leak tight seal in response to the crimping force being applied to the heat shrunk plastic ring.

6. The female press fitting of claim 1 wherein the sealing element is driven inwardly into a sealing contact with the male pipe or fitting in response to the crimping force being applied to the raised bead.

7. The female press fitting of claim 1 wherein the sealing element comprises an O-ring.

8. The female press fitting of claim 1 wherein the heat shrunk plastic ring has a perforation line that enable the heat shrunk plastic ring to break and separate from the female press fitting.

9. The female press fitting of claim 8 wherein the perforation line extends transversely across the heat shrunk plastic ring, and wherein the heat shrunk plastic ring breaks in the one place along the perforated line.

10. The female press fitting of claim 1 wherein the heat shrunk plastic ring vary in thickness and break at a relatively thin area.

11. The female press fitting of claim 1 wherein the heat shrunk plastic ring has a uniform thickness at a yield strength designed to break in response to the crimping force.

12. The female press fitting of claim 1 wherein the heat shrunk plastic ring is designed to break at 20% of the crimping force of 7200 pounds.

13. The female press fitting of claim 1 wherein the raised bead form a rounded protrusion.

14. The female press fitting of claim 1 wherein the female press fitting has a diameter between half an inch and two inches.

15. The female press fitting of claim 1 wherein the pipe section between the two ends has a linear portion.

16. The female press fitting of claim 1 wherein the female press fitting is made of copper.

* * * * *